United States Patent
Boe et al.

(10) Patent No.: US 8,190,309 B2
(45) Date of Patent: May 29, 2012

(54) METHOD AND DEVICE FOR DETECTING A LATERAL DISSYMMETRY OF AN AIRCRAFT

(75) Inventors: Regis Boe, Leguevin (FR); Dominique Chatrenet, Cornebarrieu (FR)

(73) Assignee: Airbus Operations SAS, Toulouse (FR)

( * ) Notice: Subject to any disclaimer, the term of this patent is extended or adjusted under 35 U.S.C. 154(b) by 944 days.

(21) Appl. No.: 12/162,469

(22) PCT Filed: Feb. 14, 2007

(86) PCT No.: PCT/FR2007/000259
§ 371 (c)(1),
(2), (4) Date: Jul. 28, 2008

(87) PCT Pub. No.: WO2007/096501
PCT Pub. Date: Aug. 30, 2007

(65) Prior Publication Data
US 2009/0005919 A1    Jan. 1, 2009

(30) Foreign Application Priority Data
Feb. 20, 2006  (FR) ..................................... 06 01454

(51) Int. Cl.
*G01C 5/00*   (2006.01)
(52) U.S. Cl. ....... 701/9; 701/3; 701/4; 701/16; 340/945; 340/967; 340/975; 342/33; 342/34; 342/35; 342/36
(58) Field of Classification Search ................. 701/3, 4, 701/16, 9, 10, 301; 340/967.975, 945; 342/33–36
See application file for complete search history.

(56) References Cited

U.S. PATENT DOCUMENTS

| 4,521,060 A | 6/1985 | Linton |
| 4,964,599 A * | 10/1990 | Farineau ........................ 244/195 |
| 5,057,834 A * | 10/1991 | Nordstrom .................... 340/963 |
| 5,358,199 A | 10/1994 | Hayes |
| 5,686,907 A | 11/1997 | Bedell |
| 2005/0030204 A1 | 2/2005 | Hurt |

OTHER PUBLICATIONS

International Search Report dated Jun. 26, 2007 w/ English translation.
Written Opinion of the International Searching Authority with English translation.

* cited by examiner

*Primary Examiner* — Thomas G. Black
*Assistant Examiner* — Luke Huynh
(74) *Attorney, Agent, or Firm* — Dickinson Wright PLLC

(57) ABSTRACT

Disclosed is a method and device for detecting lateral dissymmetry of an aircraft. A control parameter determination unit is used to determine a current value of a control parameter representative of all roll control surfaces of the aircraft, and a control parameter comparison unit is used to compare the determined current value with a predetermined reference value. A current deflection angle of a lateral stick of the aircraft is also determined, and the determined current deflection angle is compared with a predetermined angle value. A visual alarm signal is output, when the current value of the roll control surfaces of the aircraft is greater than a predetermined reference value and the lateral stick is at a deflection angle that is greater than a predetermined angle value.

15 Claims, 1 Drawing Sheet

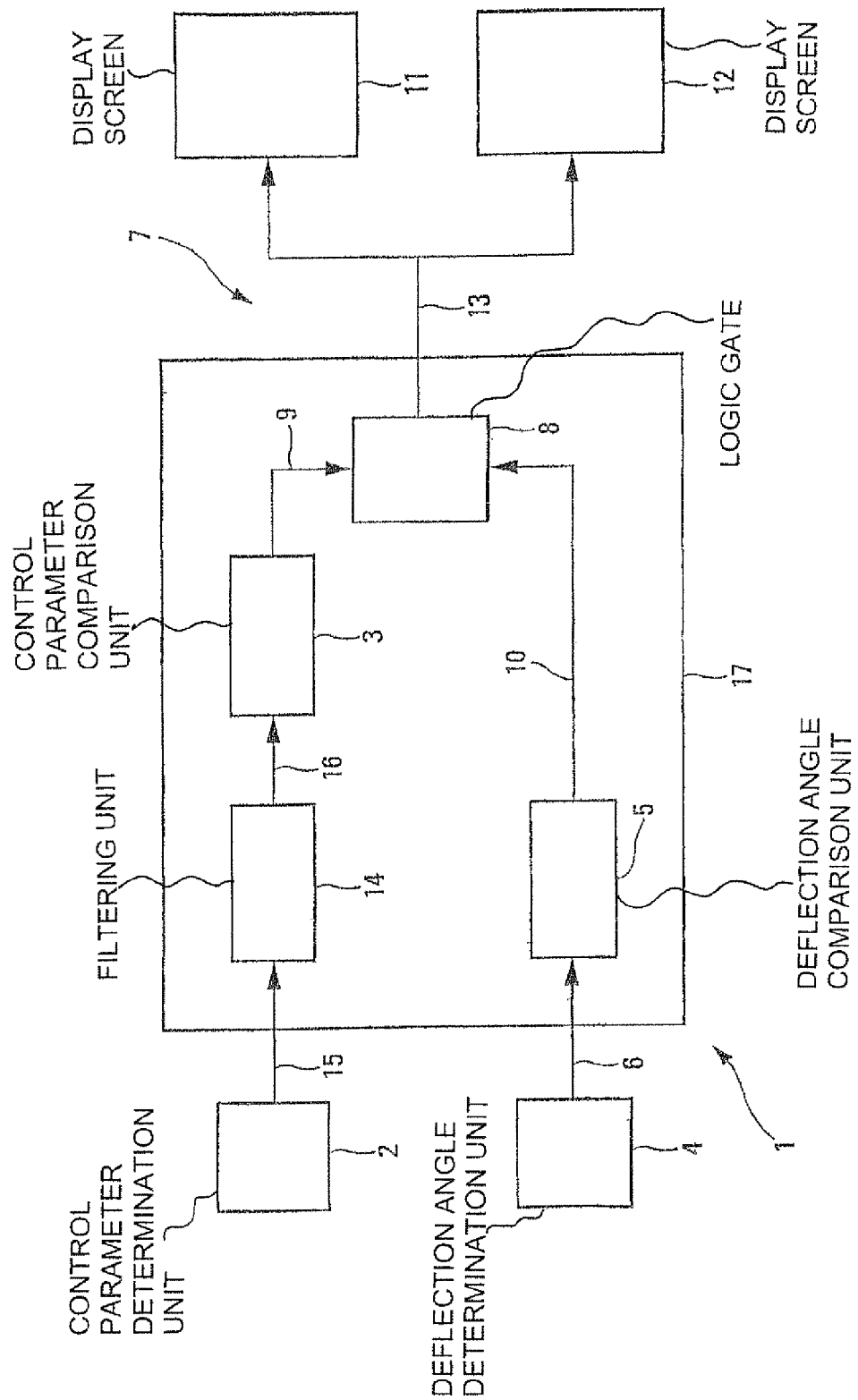

METHOD AND DEVICE FOR DETECTING A LATERAL DISSYMMETRY OF AN AIRCRAFT

FIELD OF THE INVENTION

The present invention relates to a method and a device for detecting a lateral dissymmetry of an aircraft, in particular a transport airplane.

BACKGROUND OF THE INVENTION

Such a lateral dissymmetry occurs when the usual roll control surfaces of the aircraft are positioned close to their end stops, without having been controlled by the pilot of the aircraft.

SUMMARY OF THE INVENTION

According to the invention, said method of detecting a lateral dissymmetry of an aircraft is noteworthy in that:
a) the current value of a control parameter is determined which is representative of all the roll control surfaces of the aircraft;
b) this current value of said control parameter is compared with a predetermined reference value, 160 for example;
c) a current deflection angle of a lateral stick of the aircraft is determined, which is likely to be operated by a pilot of the aircraft to control said roll control surfaces;
d) this current deflection angle is compared with a predetermined angle value, 100 for example; and
e) if both said current value of said control parameter is greater than said reference value and said current deflection angle is greater than said angle value, a visual alarm signal is output to at least one display screen of the cockpit of the aircraft, which signals the detection of a lateral dissymmetry of the aircraft.

In the step e), said visual alarm signal can, advantageously, correspond to:
 the presentation of a characteristic sign (illustrating a sideslip objective that the pilot must achieve by acting on the rudder bar and on the lateral stick of the aircraft) on a primary piloting screen, for example of PFD (Primary Flight Display) type, of the aircraft; and/or
 the blinking of characteristic signs which illustrate flaps of the aircraft and which are displayed on a screen of a system, for example of the CDS (Control and Display System) type, of the aircraft.

It is also, however, possible to provide for the output of a non-visual alarm signal, for example a sound alarm signal, in said step e), when a lateral dissymmetry has been detected.

In a particular embodiment, before comparing, in the step b), the current value of said control parameter with the reference value, said current value is filtered time-wise. This makes it possible to detect a permanent lateral dissymmetry, while avoiding outputting an alarm signal on transient dynamic maneuvers for which the abovementioned alarm triggering conditions would be met.

The present invention also relates to a device for detecting a lateral dissymmetry of an aircraft, in particular of a transport airplane.

According to the invention, said detection device is noteworthy in that it comprises:
 a first means for determining the current value of a control parameter which is representative of all the roll control surfaces of the aircraft;
 a second means for comparing this current value of said control parameter with a predetermined reference value;
 a third means for determining a current deflection angle of a lateral stick of the aircraft, which is likely to be operated by a pilot of the aircraft to control said roll control surfaces;
 a fourth means for comparing this current deflection angle with a predetermined angle value; and
 a fifth means:
  which comprises at least one display screen, for example a primary piloting screen or a screen of a control and display system of the aircraft, and preferably an AND logic gate; and
  which can output a visual alarm signal on said display screen, to signal the detection of a lateral dissymmetry, when both said current value of said control parameter is greater than said reference value and said current deflection angle is greater than said angle value.

Furthermore, in a particular embodiment, said detection device also comprises a time filtering means which is arranged between said first and second means.

BRIEF DESCRIPTION OF THE DRAWINGS

The single FIGURE of the appended drawing will clearly show how the invention can be implemented. This single FIGURE is the block diagram of a detection device according to the invention.

DETAILED DESCRIPTION OF THE INVENTION

The device 1 according to the invention and diagrammatically represented in the FIGURE is intended to detect a lateral dissymmetry of an aircraft, in particular of a transport airplane, not represented. It is known that such a lateral dissymmetry occurs when the usual roll control surfaces (not represented) of the aircraft are positioned close to their end stops, without having been controlled for this by the pilot of the aircraft.

For this, said detection device 1 comprises, according to the invention:
 a means 2 for determining the current value of a computer internal control parameter which is representative of all the roll control surfaces of the aircraft. This parameter reflects the quantity of lateral stick that would be needed in the case of a direct pilot—control surface link. For a destination-piloted aircraft, the control surfaces can be turned even though the pilot does not act on the lateral stick;
 a means 3 for comparing this current value of said control parameter with a stored predetermined reference value, for example 160;
 a usual means 4, which is associated with a lateral stick (not represented) of the aircraft, for example of mini-stick type, which is formed so as to determine a current deflection angle of said lateral stick. This lateral stick can be operated, in the usual way, by a pilot of the aircraft to control said roll control surfaces;
 a means 5 which is linked via a link 6 to said means 4 and which is intended to compare the current deflection angle received from said means 4 with a stored predetermined angle value, for example 10°; and
 a means 7 which is intended to detect and to signal a lateral dissymmetry of the aircraft, according to the comparisons implemented by said means 3 and 5.

According to the invention, said means 7 comprises an AND logic gate 8, which is linked via links 9 and 10 respectively to said means 3 and 5. This AND logic gate 8 is formed in such a way as to output a lateral dissymmetry detection signal, when both:

the current value of said control parameter is greater than said reference value; and said current deflection angle of the lateral stick is greater than said angle value.

Said means 7 also comprises display screens 11 and 12 which are linked via a link 13 to the output of said AND logic gate 8 and which are formed in such a way as to output a visual alarm signal when a lateral dissymmetry is detected.

In a particular embodiment, said means 7 can also include a usual element (not represented) which can output a non-visual alarm signal, and in particular a sound alarm signal, when a lateral dissymmetry is detected.

Furthermore, in a preferred embodiment, said detection device 1 also comprises a usual filtering means 14 which is linked via links 15 and 16 respectively to said means 2 and 3 and which is formed in such a way as to filter time-wise the current value of the control parameter, determined by said means 2, before transmitting it to said means 3. Preferably, the time filtering applied by this filtering means 14 uses, as threshold value, 3 seconds so as to retain only the current values which keep the same value for at least 3 seconds. This makes it possible to detect a permanent lateral dissymmetry, while avoiding outputting an alarm signal on transient dynamic maneuvers (less than 3 seconds) for which the abovementioned alarm triggering conditions would be met.

In a particular embodiment, said means 3, 5, 8 and 14 are incorporated in a computer 17, for example a primary computer of PRIM type.

Furthermore, in a preferred embodiment, said display screen 11 is a primary piloting screen of the aircraft, for example of PFD (Primary Flight Display) type, and the alarm signal output if a lateral dissymmetry is detected corresponds to the display on this primary piloting screen 11 of a characteristic sign illustrating a side-slip objective that the pilot must achieve by acting on the rudder bar and on the lateral stick of the aircraft.

Furthermore, said display screen 12 can be a screen of a system of the aircraft, for example of the CDS (Control and Display System) type. In this case, the visual alarm signal can correspond to the blinking of characteristic signs which illustrate flaps of the aircraft and which are displayed on this display screen 12.

The device 1 according to the invention presents in particular the following advantages:

it makes it possible to warn that the aircraft is close to its roll control capability limits, when the pilot is not necessarily aware thereof; and it makes it possible to warn of a dissymmetry situation (fuel dissymmetry, surface loading, etc.) that the systems would not have detected.

The invention claimed is:

1. A method of detecting lateral dissymmetry of an aircraft, the method comprising the steps of:
    a) determining, by a control parameter determination unit, a current value of a control parameter representative of all roll control surfaces of the aircraft;
    b) comparing, by a control parameter comparison unit, the determined current value of said control parameter with a predetermined reference value;
    c) determining, by deflection angle determination unit, a current deflection angle of a lateral stick of the aircraft, wherein the lateral stick is operated by a pilot of the aircraft to control said roll control surfaces;
    d) comparing, by a deflection angle comparison unit, the determined current deflection angle of the lateral stick with a predetermined angle value; and
    e) outputting a visual alarm signal to at least one display screen of a cockpit of the aircraft, under a condition in which both: 1) the determined current value of the control parameter is greater than the reference value and 2) the determined current deflection angle of the lateral stick is greater than the predetermined angle value, to signal the detection of lateral dissymmetry of the aircraft.

2. The method as claimed in claim 1, wherein, before comparing, in the step b), the current value of said control parameter with the predetermined reference value, said current value of the control parameter is filtered time-wise.

3. The method as claimed in claim 1, wherein said predetermined reference value is equal to 16°.

4. The method as claimed in claim 1, wherein said predetermined angle value is equal to 10°.

5. The method as claimed in claim 1, wherein, in the step e), said visual alarm signal corresponds to a characteristic sign illustrating a pilot side-slip objective.

6. The method as claimed in claim 1, wherein, in the step e), said visual alarm signal corresponds to blinking signs which illustrate flaps of the aircraft and which are displayed on a screen of a control and display system of the aircraft.

7. The method as claimed in claim 1, wherein in the step e), a non-visual alarm signal is also output.

8. A device for detecting a lateral dissymmetry of an aircraft, the device comprising:
    a control parameter determination unit the determines a current value of a control parameter representative of all roll control surfaces of the aircraft;
    a control parameter comparison unit that compares the determined current value of said control parameter with a predetermined reference value;
    a deflection angle determination unit that determines a current deflection angle of a lateral stick of the aircraft, wherein the lateral stick is operated by a pilot of the aircraft to control said roll control surfaces;
    a deflection angle comparison unit that compares the determined current deflection angle with a predetermined angle value; and
    a logic gate that outputs a visual alarm signal to at least one display screen, to signal the detection of a lateral dissymmetry, under a condition in which both said current value of said control parameter is greater than said predetermined reference value and said current deflection angle is greater than said predetermined angle value.

9. The device as claimed in claim 8, further comprising a time filtering means is arranged between said control parameter determination unit and said control parameter comparison unit.

10. The device as claimed in claim 8, wherein said display screen is a primary piloting screen of the aircraft.

11. The device as claimed in claim 8, wherein said display screen is a screen of a control and display system of the aircraft.

12. The device as claimed in claim 8, wherein said logic gate is an AND logic gate.

13. An aircraft, comprising the device of claim 8.

14. The method of claim 1, further comprising a step of filtering, by a filtering unit, the determined current value of the control parameter before transmitting the determined current value to the control parameter comparison unit.

15. The device of claim 8, further comprising a filtering unit that filters the determined current value of the control parameter before transmitting the determined current value to the control parameter comparison unit.

* * * * *